(12) United States Patent
Wier

(10) Patent No.: US 9,789,847 B2
(45) Date of Patent: Oct. 17, 2017

(54) BELT REEL

(71) Applicant: Adolf Foehl GmbH + Co. KG, Rudersberg (DE)

(72) Inventor: Franz Wier, Göggingen (DE)

(73) Assignee: Adolf Foehl Gmbh & Co. KG (DE)

( * ) Notice: Subject to any disclaimer, the term of this patent is extended or adjusted under 35 U.S.C. 154(b) by 149 days.

(21) Appl. No.: 14/428,380

(22) PCT Filed: Sep. 16, 2013

(86) PCT No.: PCT/EP2013/002785
§ 371 (c)(1),
(2) Date: Jul. 16, 2015

(87) PCT Pub. No.: WO2014/040750
PCT Pub. Date: Mar. 20, 2014

(65) Prior Publication Data
US 2016/0075304 A1 Mar. 17, 2016

(30) Foreign Application Priority Data

Sep. 17, 2012 (DE) .......................... 10 2012 018 263

(51) Int. Cl.
*B60R 22/34* (2006.01)
(52) U.S. Cl.
CPC ...... *B60R 22/34* (2013.01); *B60R 2022/3427* (2013.01)

(58) Field of Classification Search
CPC .................. B60R 22/34; B60R 2022/3427
See application file for complete search history.

(56) References Cited

U.S. PATENT DOCUMENTS

| | | | |
|---|---|---|---|
| 4,254,921 A | 3/1981 | Adomeit | |
| 4,967,976 A * | 11/1990 | Kawai | ..................... B60R 22/34 242/376 |
| 5,984,223 A * | 11/1999 | Hiramatsu | .......... B60R 22/4676 242/374 |
| 6,336,606 B1 * | 1/2002 | Smithson | ................ B60R 22/34 242/376 |
| 6,405,962 B1 * | 6/2002 | Hirase | ................. B60R 22/3413 242/379.1 |
| 2003/0010858 A1 | 1/2003 | Wier | |

FOREIGN PATENT DOCUMENTS

DE 2837099 5/1979

* cited by examiner

*Primary Examiner* — Sang Kim
(74) *Attorney, Agent, or Firm* — Tarolli, Sundheim, Covell & Tummino LLP

(57) ABSTRACT

The invention relates to a belt reel (10) for a seat belt of a vehicle, said reel comprising a plastic base body (22) with a receiving chamber (26) that contains a belt strap pin (34) for securing a belt strap (36). In said reel, a first end (52) of the belt strap pin (34) is directly supported on the base body (22) of the belt reel (10) and a second end (56) of the belt strap pin (34) is secured in a separate receiving part (54) that is attached to the base body (22).

15 Claims, 2 Drawing Sheets

BELT REEL

RELATED APPLICATIONS

This application corresponds to PCT/EP2013/002785, filed Sep. 16, 2013, which claims the benefit of German Application No. 10 2012 018 263.5, filed Sep. 17, 2012, the subject matter, of which are incorporated herein by reference in their entirety.

BACKGROUND OF THE INVENTION

The invention relates to a belt reel for a seat belt of a vehicle, including a base body composed of plastic that which has a receiving space, in which a belt strap pin is provided for fixation of a belt strap.

To fix a belt strap on a belt reel, belt reels have a belt strap pin that is arranged in a receiving space of the reel body. At the end of the belt strap, a loop is provided, which is guided into the receiving space through a receiving gap. The belt strap pin is guided through this loop and fastened in the coil body so that the belt strap is securely held in the coil body.

When the belt strap is not completely uncoiled from the belt reel, the tensile forces affecting the belt strap are partly transferred to the outer surface of the belt reel. When the belt strap is fully unwound, however, the load is fully transmitted via the belt strap pin so that the belt strap pin or its bearing has to be dimensioned correspondingly stable. For cost reasons, belt reels are frequently made of plastic, for instance of fiber-reinforced plastics. However, these belt reels are subject to the same strength requirements as conventional belt reels. Additionally, a simple assembly and disassembly is desired, for example to replace the belt reel. In belt reels provided with a torsion bar in the receiving space, the belt strap pin is capable of supporting itself on the torsion bar in order to reduce the load on the reel body.

SUMMARY OF THE INVENTION

It is an object of the invention to provide a belt reel with a base body made of plastic that ensures a fastening of the belt strap pin within the receiving space independent of further components in the receiving space, and also enables a simple assembly or disassembly of the belt strap pin or the belt strap.

To achieve this object, a belt reel for a safety belt in a vehicle is provided, including a base body made of plastic and having a receiving space in which a belt strap pin is provided to fixate the belt strap, wherein a first end of the belt strap pin is directly held on the base body of the belt reel and a second end of the belt strap pin is held in a separate receiving part that is fixed to the base body.

According to the invention, two bearings are provided on the belt reel in which the belt strap pin can be inserted and which fixate the belt strap pin in the receiving space. Because one of these bearings is situated on a separate receiving part, the belt strap pin can be inserted with one end into the bearing that is directly provided on the base body, and subsequently the receiving part together with the second bearing can be pushed onto the second end of the belt strap pin and fixated on the base body. This enables a simple and fast fixation of the belt strap pin because the belt strap pin can simply be inserted into the receiving space and is fixated by the receiving part. Since both ends of the belt strap pin are securely fixated on the belt reel, a shifting of the belt strap pin is not possible. The belt reel may be reinforced in the area of these bearings so that these can safely absorb and transmit the occurring loads. The remaining areas of the belt reel may be dimensioned more lightweight.

A first end side of the receiving space may for instance be closed, and the first end of the belt strap pin held in this end side. The receiving space may for example be configured cylindrical, wherein the cylinder axis corresponds to the rotation axis of the belt reel. This receiving space is open on one of the flanges so that the belt strap pin is inserted into the receiving space in axial direction.

In this embodiment, an opening is provided at the second end side of the receiving space and the receiving part is fixated in this opening. This means that the opening and the receiving space are sealed by the receiving part, wherein the belt strap pin is securely held in axial direction.

On the receiving part a bearing for the belt reel may also be provided. The further bearing is for example provided on the first end side of the base body. In this embodiment, the receiving part cannot be moved out of the opening in axial direction because the shifting of the receiving part out of the opening is prevented by a belt retractor frame or other components, in which the bearings are supported. As a result, a secure fixation of the receiving part on the base body of the belt reel and a secure fixation of the belt strap pin is ensured without further components or fastening devices.

On the receiving element, a further mounting for components of a bell retractor, particularly a retractor spring can be provided. The receiving part can easily be exchanged so that a simple adaptation to specific retractor springs or other components of the belt retractor is possible. In such an embodiment, the receiving element is configured so that it cannot be rotated relative to the base body with regard to the rotation axis of the belt real, so that torques can be reliably transmitted between the receiving part and the base body.

On the end sides of the base body, flanges can be provided, which in particular have toothings, in which for example a locking mechanism can engage. The ends of the belt strap pin can protrude into these flanges in longitudinal direction so that a direct load support from the belt strap pin to the flanges and from there to the belt retractor frame is accomplished.

The receiving part can for example also extent into the receiving space and stabilize it.

Preferably, the axis of the belt strap pin extends eccentrically to the axis of the base body. As a result, space is provided in the receiving space for an optional torsion bar or another force limiter, which has to be arranged centrically within the receiving space. Preferably, the axis of the belt strap pin is arranged on a side of the base body's axis, which faces away from the receiving gap. The belt strap is usually sewn as a loop, wherein the seam area is significantly more rigid than the remaining belt strap. The eccentric arrangement of the belt strap pin is preferably such that this more rigid seam area is situated within the belt reel so as to not impede the winding up of the belt strap to the belt reel.

The base body has for example hollow spaces, which in particular are reinforced with longitudinal ribs and/or transverse ribs. This allows significantly saving material and with this reduce the weight of the belt reel while maintaining the same stability. The longitudinal ribs and/or transverse ribs can be arranged in areas exposed to particularly high stresses so that the belt reel has sufficient stability.

The base body can for example have an outer surface, that is substantially closed in circumferential direction.

In order to stabilize areas of the base body and the belt reel that are exposed to particularly high stresses, it is also possible to arrange inserts, in particular made of metal, within the base body, which provide higher strength than plastics.

Preferably, the belt reel is produced by way of an injection molding process, in particular by a multi-component injection molding process. In such a multi-component injection molding process further components, for example inserts or components that for example provide a spring function, an elastic support for the belt reel or noise-insulated support, may be molded onto the belt reel in one piece.

The belt strap pin preferably has a diameter between 7 and 10 mm.

BRIEF DESCRIPTION OF THE DRAWINGS

Further advantages and features will become apparent from the following description in conjunction with the enclosed drawings. It is shown in.

DESCRIPTION

Figure 1:
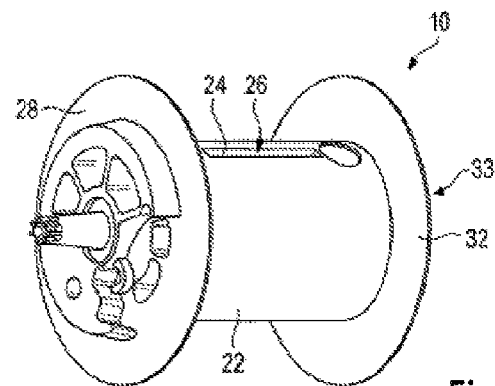
FIG. 1 a perspective view of a belt reel according to the invention.
Figure 2:
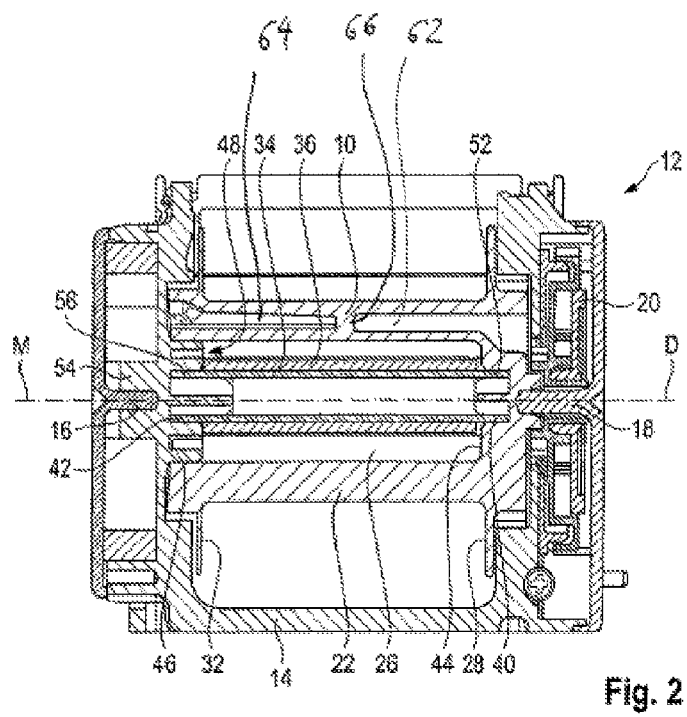
FIG. 2 a sectional view through a belt retractor with a belt reel according to the invention, FIG. 3 a sectional view through a belt retractor as shown in FIG. 1, and FIG. 4 a detailed view of the receiving part of the belt reel as shown in FIG. 1.

FIG. 1 shows a belt reel 10 for a belt retractor 12 as shown in FIG. 2. The belt retractor 12 is a conventional belt retractor with a frame 14, bearings 16, 18 for the belt reel 10 as well as a locking mechanism 20 and a retractor mechanism for the belt reel 10 that is not shown in detail.

The belt reel 12 has a base body 22 with a receiving gap 24, through which a receiving space 26 within the base body 22 is accessible. The belt reel 10 also has a first flange 28, which has connecting devices for the retractor mechanism as well as a second flange 32 with a toothing 33 into which the locking mechanism 20 can engages.

Figure 3:
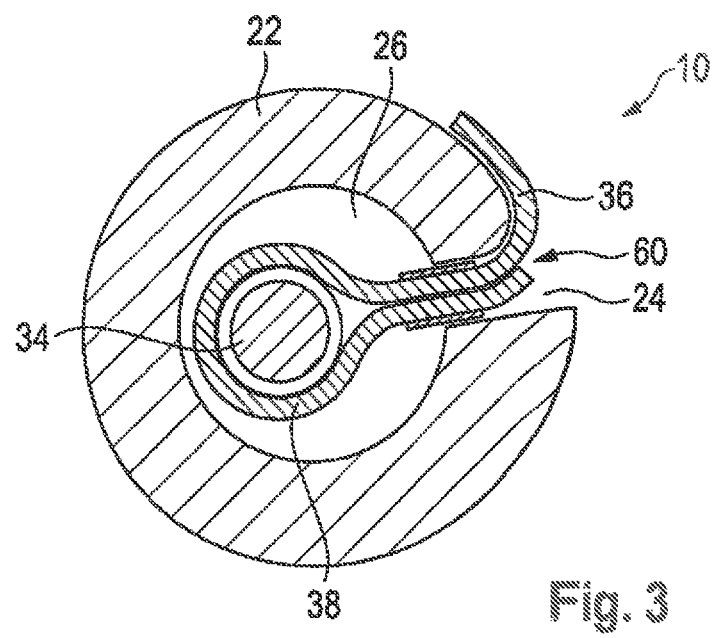

Within the receiving space 26 a belt strap pin 34 is provided, to which a belt strap 36 of a safety belt may be fastened (see FIG. 3). The end of the belt strap 38 is sewn into a loop 38 through which the belt strap pin 34 passes. Within the receiving space 26 bearings 40, 43 are provided on which the belt strap pin 34 is supported so as to be securely held within the receiving space 26 (FIG. 2).

As shown in FIG. 2 the receiving space 26 is substantially configured cylindrical, wherein the central axis M of the receiving space 26 corresponds to the rotation axis D of the belt reel 10. On a first end side 44, the receiving space 26 is closed. On the second end side 46, the receiving space 26 has an opening 48.

The first bearing 40 for the first end 52 of the belt strap pin 34 is provided on the first end side 44. A receiving element 54 is inserted into the opening 48, on which receiving element the second bearing 42 for the second end 56 of the belt strap pin 34 is located.

In order to install the belt retractor 12, the belt strap 36 is inserted with the loop 38 through the receiving gap 24 into the receiving space 26. Subsequently, the belt strap pin 34 is pushed through the opening 48 into the receiving space 26 and through the loop 38 of the belt strap 36, until the first end 52 of the belt strap pin 34 is inserted into the first bearing 40.

Then, the receiving element 54 is inserted into the opening 48, wherein the second bearing 42 is placed onto the second end 56 of the belt strap pin 34. As a result, the belt strap pin 34 is securely held between both bearings 40, 42.

As shown in FIG. 2, the first bearing 40 or respectively the first end side 44 is arranged within the first flange 28. The receiving part 54 is arranged with the second support in the second flange 32. As a consequence, loads can be transmitted directly from the belt strap pin 34 to the flanges 28, 34 and consequently to the frame 14 of the belt retractor 12.

Figure 4:
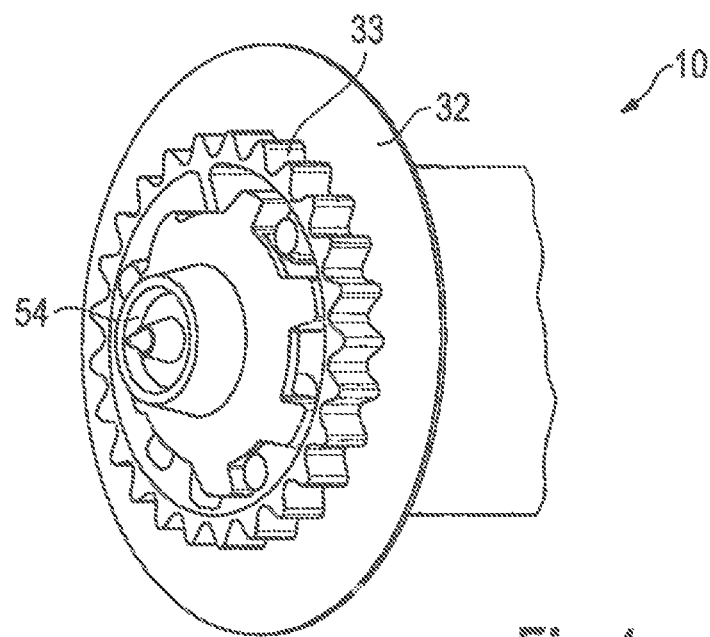

As shown in FIG. 1 and particularly in FIG. 4, the bearing of the second flange 32 is in this case arranged on the receiving element 54. When the belt reel 10 is mounted in the belt retractor 12, an axial shifting and thus a release of the belt strap pin's 34 fixation is not possible because the receiving element 54 abuts a bearing 16 of the belt retractor 12. As a result, the belt strap pin 34 is securely fastened when the belt reel 10 is mounted in the belt retractor 12.

As shown in FIG. 4, the receiving element 54 and the second flange 32 are configured so that the receiving element 54 extends into the receiving space 26, thereby providing a further stabilization of the receiving space 26 or the base body 22 of the belt reel 10.

In addition, the receiving element 54 and the second flange 32 provide an cooperating torque transmission profile, so that torques may be transmitted between receiving element 54 and belt reel 10. Additional components can therefore engage on the receiving element 54 of the belt retractor 12, for instance a spring retractor.

The belt strap pin 34 may be arranged in any desired manner within the receiving space 26. In the shown embodiment, the belt strap pin 34 is arranged eccentrically to the axis of the base body 22. As a consequence, the seam area 60 of the belt strap 26 is held in the base body so that the seam area 60 does not protrude out of the receiving gap 24 and does not impede the winding up of the belt strap 36.

An eccentric support of the belt strap pin 34 also allows arrangement of further components in the receiving space, for example a torsion bar or another force limiter.

For weight reasons, the base body is preferably made of plastic, wherein the base body 22, in addition to the receiving space 26, further includes hollow spaces 62, 64, which are stiffened by longitudinal ribs or transverse ribs 66.

Additionally, inserts for example made of metal, may be arranged within the base body 22, to reinforce areas that are exposed to particularly high stresses. The outer surface of the base body may, for example, be closed in circumferential direction, except for the receiving gap 24.

The belt reel 10 can for example be produced by way of an injection molding process, wherein a multi-component injection molding process allows molding-on further components. These components may, for example, provide a spring function or effect an elastic or noise-insulated support of the belt reel.

The invention claimed is:

1. A belt reel (10) for a seat belt of a vehicle, comprising a base body (22) composed of plastic that has a receiving space (26), in which a belt strap pin (34) is provided in order to fixate a belt strap (36), wherein a first end (52) of the belt strap pin (34) is held directly on the base body (22) of the belt reel (10) and a second end (56) of the belt strap pin (34) is held within a separate receiving part (54) that is fastened to the base body (22).

2. The belt reel according to claim 1, wherein a first end side (44) of the receiving space (26) is closed and the first end (52) of the belt strap pin (34) is held within the first end side (44).

3. The belt reel according to claim 1, wherein an opening (48) is provided on a second end side (46) of the receiving space (26) and the receiving part (54) is fastened to the opening (48).

4. The belt reel according to claim 1, wherein a support for the belt reel (10) is provided on the receiving element (54).

5. The belt reel according to claim 1, wherein a receiving space is provided on the receiving element (54) for receiving components of a belt retractor (12).

6. The belt reel according to claim 5, wherein the receiving space (26) is provided on the receiving element (54) for receiving a spring retractor.

7. The belt reel according to claim 1, wherein flanges (28, 32) having toothings (33) are provided on the end sides (44, 46) of the base body (22), and the ends (52, 56) of the belt strap pin (34) extent into these flanges (28, 32) in longitudinal direction.

8. The belt reel according to claim 1, wherein the receiving part (54) extents into the receiving space (26) and stabilizes it.

9. The belt reel according to claim 1, wherein the axis of the belt strap pin (34) extends eccentrically to the axis of the base body (22).

10. The belt reel according to claim 1, wherein the base body (22) has hollow spaces (62, 64), which are stiffened with at least one of longitudinal ribs (66) and transverse ribs (66).

11. The belt reel according to claim 1, wherein the base body (22) has a outer surface that is substantially closed in circumferential direction.

12. The belt reel according to claim 1, wherein a first end side (44) of the receiving space (26) includes a first bearing (40) that supports the first end (52) of the belt strap pin (34), and the receiving element (54) includes a second bearing (42) that supports the second end (56) of the belt strap pin (34).

13. The belt reel according to claim 12, wherein the first end (52) of the belt strap pin (34) directly engages the first bearing (40), and the second end (56) of the belt strap pin (34) directly engages the second bearing (42).

14. The belt reel according to claim 1, wherein the first end (52) of the belt strap pin (34) directly engages the base body (22) of the belt reel (10).

15. The belt reel according to claim 1, wherein the base body (22) includes a receiving gap (24) through which the receiving space (26) is accessible, and the length of the belt strap pin (34) is greater than the length of the receiving gap (24).

* * * * *